(12) United States Patent
Brower (10) Patent No.: US 12,429,613 B2
(45) Date of Patent: Sep. 30, 2025

(54) BOUNDARY TRAVERSAL SENSING APPARATUS AND SYSTEM COMPRISING SAME

(71) Applicant: Astro Technology Group, LLC, Houston, TX (US)

(72) Inventor: David Verl Brower, Houston, TX (US)

(73) Assignee: Astro Technology Group, LLC, Houston, TX (US)

( * ) Notice: Subject to any disclaimer, the term of this patent is extended or adjusted under 35 U.S.C. 154(b) by 221 days.

(21) Appl. No.: 18/183,671

(22) Filed: Mar. 14, 2023

(65) Prior Publication Data

US 2024/0310538 A1    Sep. 19, 2024

(51) Int. Cl.
*G01V 1/22* (2006.01)
*G01V 1/00* (2006.01)

(52) U.S. Cl.
CPC .............. *G01V 1/226* (2013.01); *G01V 1/001* (2013.01); *G01V 1/22* (2013.01)

(58) Field of Classification Search
CPC . G01V 1/00; G01V 1/001; G01V 1/22; G01V 1/226; G01V 8/12; H01L 31/00; H01L 31/02; H01L 31/16; H01L 31/18
See application file for complete search history.

(56) References Cited

U.S. PATENT DOCUMENTS

| | | | |
|---|---|---|---|
| 2004/0004559 A1* | 1/2004 | Rast | G06F 3/0233 341/22 |
| 2017/0052277 A1* | 2/2017 | Wong | G01V 8/12 |
| 2017/0248462 A1* | 8/2017 | Farhadiroushan | G01H 9/004 |

* cited by examiner

*Primary Examiner* — Van T Trieu
(74) *Attorney, Agent, or Firm* — David O. Simmons; IVC Patent Agency (57) ABSTRACT

Disclosed herein are systems and methods configured to produce and monitor signals that characterize activities corresponding to intruders (e.g., persons and/or animals) traversing a boundary that at least partially defines a designated area. Such activities can characterize one or more persons traversing a boundary or attempting to traverse a barrier that defines the boundary. Sensors within a substrate that extends along the boundary can be used for producing such signals. The substrate can be soil of which ground at the boundary is comprised, a manmade material located within such soil or a material from which a barrier along the boundary is constructed. The sensors can be fiber optic sensors that extend contiguously along a length of the boundary and/or can be fiber optic sensors that are located at discrete locations along the length of the boundary. The signals can cause one or more responsive actions to be implemented.

22 Claims, 5 Drawing Sheets

BOUNDARY TRAVERSAL SENSING APPARATUS AND SYSTEM COMPRISING SAME

FIELD OF THE DISCLOSURE

The disclosures made herein relate generally to systems and methods for sensing proximity and presence of persons and, more particularly, to systems and methods configured for sensing traversal of a boundary by one or more persons and optionally implementing a responsive action.

BACKGROUND

Throughout history, there has been and continues to be the need to establish and monitor boundaries. Examples of such boundaries include, but are limited to, a boundary associated with a border between regions of different sovereign entities, a boundary associated with a border between domains of different legal entities, a boundary at least partially encompassing personal property, and the like. Regardless of the specific necessity for the boundary, the implication of such boundaries is the same—property and/or persons within an area that is at least partially defined by the boundary is that of a designated entity.

In many instances, it is desirable or required to form a barrier that defines a boundary. The barrier is intended to limit, if not preclude, unauthorized access to physical property, geographical property and/or personnel that is within an area at least partially defined by the boundary. To this end, such barriers present a physical impediment to the boundary being traversed. Conventional forms of barriers include, but are not limited to, fences, walls, moats and the like.

Fence lines, walls, camera surveillance and other tools have been used for many years to monitor perimeters or borders to provide information in either real time or for archival purposes. Such systems are particularly useful in monitoring intrusion or invasion of a protected area when personnel and/or apparatus are carried out overland. It is well known that borders and perimeters of protected areas are often subjected to various types of invasion or intrusion by unauthorized personnel and/or apparatus. adverse operating conditions that can affect the intended transport and/or delivery of product flowing through such pipelines. Examples of such activity are vandals or thieves entering a protected area or traffic across borders.

Although barriers that define a boundary present a physical impediment to the boundary being traversed, it is well known that they do not and cannot unilaterally prevent the boundary being traversed. For example, borders defining geographical property (e.g., a border between different sovereign entities) are often located in remote areas. As such, the remote location of such borders presents the opportunity for unauthorized persons to traverse (e.g., go over, through or under) a barrier that extends along or adjacent to the border. Without the concern of their traversal of the barrier being detected or without the concern for such detection being responded to by authorities in a timely manner, such unauthorized border crossers can utilize extended periods of time and necessary implements for enabling them to traverse the barrier without adverse action from authorities of an area into which the unauthorized border crossers are seeking to enter. This is just one example of a manner in which a barrier defining a boundary is largely rendered ineffective due to one or more factors that cannot practically be altered (e.g., remote location, limited policing resources, motivated offenders).

Therefore, systems and methods configured for sensing traversal of a boundary and optionally implementing a responsive action would be advantageous, desirable and useful.

SUMMARY OF THE DISCLOSURE

Embodiments of the present invention are directed to apparatuses and systems configured to produce and monitor signals that characterize activities corresponding to intruders (e.g., persons and/or animals) traversing a boundary that at least partially defines a designated area. More specifically, embodiments of the present invention can be directed to apparatuses and systems configured to both prevent and monitor adverse activity along a perimeter of a protected or enclosed area or a border. In some embodiments, such activities specifically characterize one or more persons traversing a boundary or attempting to traverse a barrier that defines the boundary. Sensors within a substrate that extends along the boundary can be used for producing such signals. The substrate can be soil of which ground at the boundary is comprised, a man-made material located within such soil or a material from which a barrier along the boundary is constructed. The sensors can be fiber optic sensors that extend contiguously along a length of the boundary and/or can be fiber optic sensors that are located at discrete locations along the length of the boundary. The signals can cause one or more responsive actions to be implemented for deterring the intruders from traversing the boundary (e.g., alarms and/or lights), for determining a location at which the intruders have traversed the boundary, and/or for tracking the intruders after determining that they have traversed the boundary (e.g., via one or more fixed-location cameras and/or aerial drones).

Advantageously, embodiments of the present invention provide a simple yet effective and reliable approach of boundaries for detecting traversal thereof by one or more intruders (e.g., monitoring perimeter breach activity). Such detection boundary traversal is facilitated by monitoring signal output of fiber optic sensors located along a length of the boundary. In embodiments of the present invention, the fiber optic sensors are spaced or otherwise configured for enabling traversal events to be isolated to a suitable degree of resolution (e.g., within several 100's or 1000's of feet of the location of such event), for enabling a direction of traversal to be determined and for limiting the potential for traversal from being intentionally or unintentionally undetected. Furthermore, embodiments of the present invention advantageously provide for such fiber optic sensors to be integrated into a sensor-carrying substrate prior to deployment of such sensor-carrying substrate.

In preferred embodiments, systems and methods can utilize fiber optic sensors for monitoring vibrations and other signals generated by the unapproved activity. The system may be used with or without historic wall or fence barriers. It may also be used in connection with camera, satellite and drone systems. To this end, such fiber optic sensors can be strategically placed at a plurality of locations along a length of the border or perimeter, generally in a random patter just below the surface along the border or perimeter to be monitored. Ideally, the sensors will be placed in a random pattern and will be protected by protective housing or pads. The sensors have been shown to be sensitive enough to detect change in downward force when a person or an apparatus is positioned in the area of the sensor, for example, within two or three feet. Thus, for example, a random sensor grid with sensors approximately six feet apart will provide continuous coverage throughout the monitored area.

Embodiments of the present invention advantageously allow for such fiber optic sensors to be installed before or after installation of prior art systems. Vibration information caused by encroaching in the sensor responsive zone is communicated to a data acquisition system through one or more optical fibers. This permits near real time alerts of activity in the monitored zone and permits almost immediate response by alerting first response agencies. Cameras, drones satellite surveillance and other response systems may then be employed to respond to the target area.

In one embodiment of the present invention, a boundary traversal sensor apparatus comprises one or more detection sensors and a sensor mounting substrate. The one or more detection sensors each include a length of optical fiber having opposing end portions. The sensor mounting substrate has opposing end portions and a sensor-carrying portion extending therebetween. The length of optical fiber of each one of the one or more detection sensors is attached to the sensor-carrying portion of the sensor mounting substrate at at least a plurality of locations thereof. Each one of the opposing end portions of the optical fiber is located at a respective one of the opposing end portions of the sensor mounting substrate.

In another embodiment of the present invention, a boundary traversal sensor apparatus comprises a plurality of detection sensors and a sensor mounting substrate. The detection sensors each include a length of optical fiber having opposing end portions. The sensor mounting substrate has opposing end portions and a sensor-carrying portion extending therebetween. Each one of the opposing end portions of the sensor mounting substrate includes a substrate coupling structure engageable with at least one of a discrete substrate coupler and a substrate coupling structure of each other one of the opposing end portions of the sensor mounting substrate. The length of optical fiber of each one of the detection sensors is attached to the sensor-carrying portion of the sensor mounting substrate at one or more locations thereof. Each one of the opposing end portions of the optical fiber is located at a respective one of the opposing end portions of the sensor mounting substrate.

In another embodiment of the present invention, a border incursion zone sensor system comprises an elongated incursion zone sensor support and a plurality of elongated detection sensors extending along a length of the elongated incursion zone sensor support. The elongated incursion zone sensor support includes one or more rows of a plurality of sensor mounting substrates attached to each other in an end-to-end fashion. Each one of the elongated detection sensors extends along a length of the elongated incursion zone sensor support and is attached to the elongated incursion zone sensor support at at least a plurality of locations thereof.

These and other objects, embodiments, advantages and/or distinctions of the present invention will become readily apparent upon further review of the following specification, associated drawings and appended claims.

DETAILED DESCRIPTION

Figure 1:
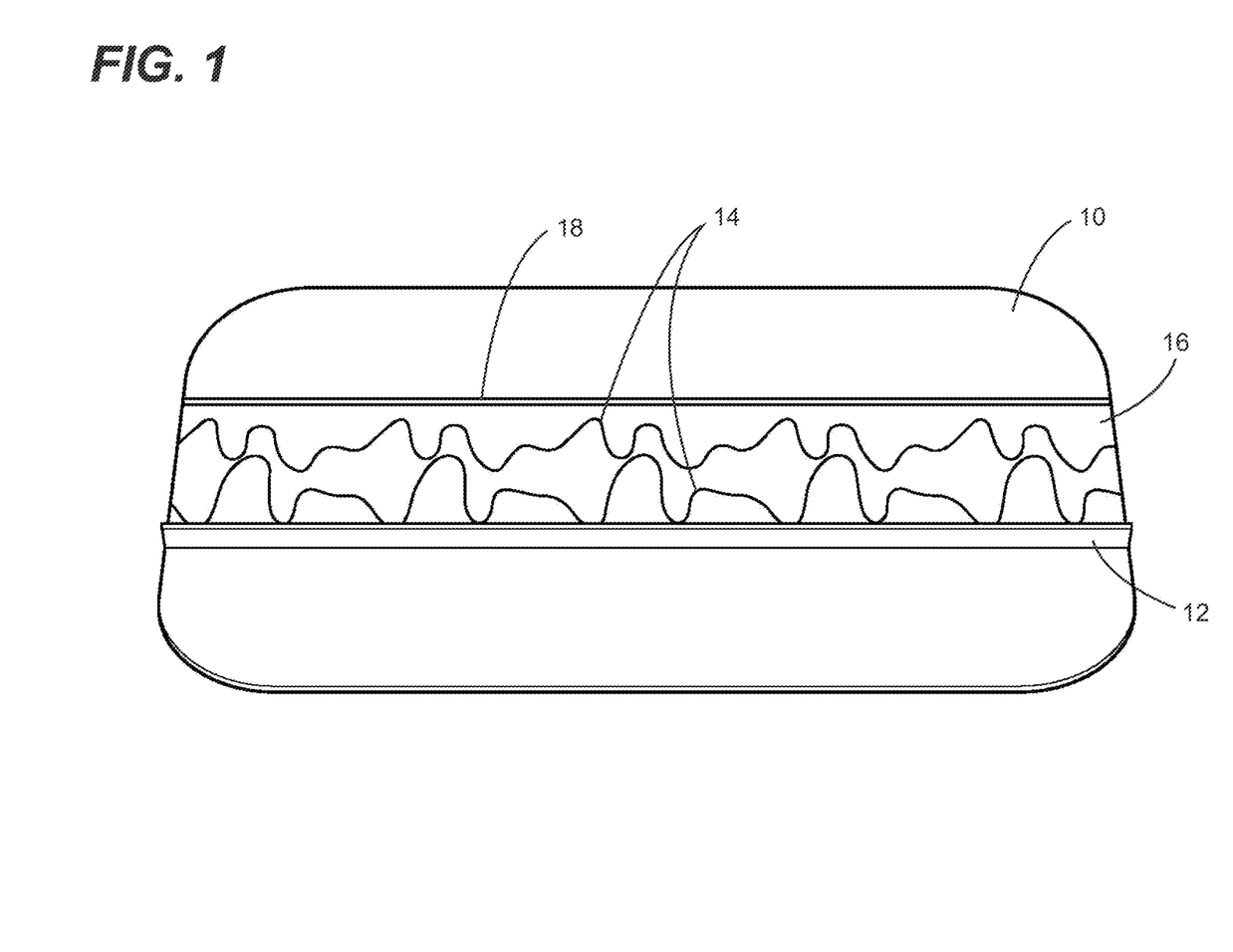
FIG. 1 is a diagrammatic view showing an outer fence or wall, an inner fence or wall and an intrusion detection zone containing an under-surface fiber optic sensor network.
Figure 2:
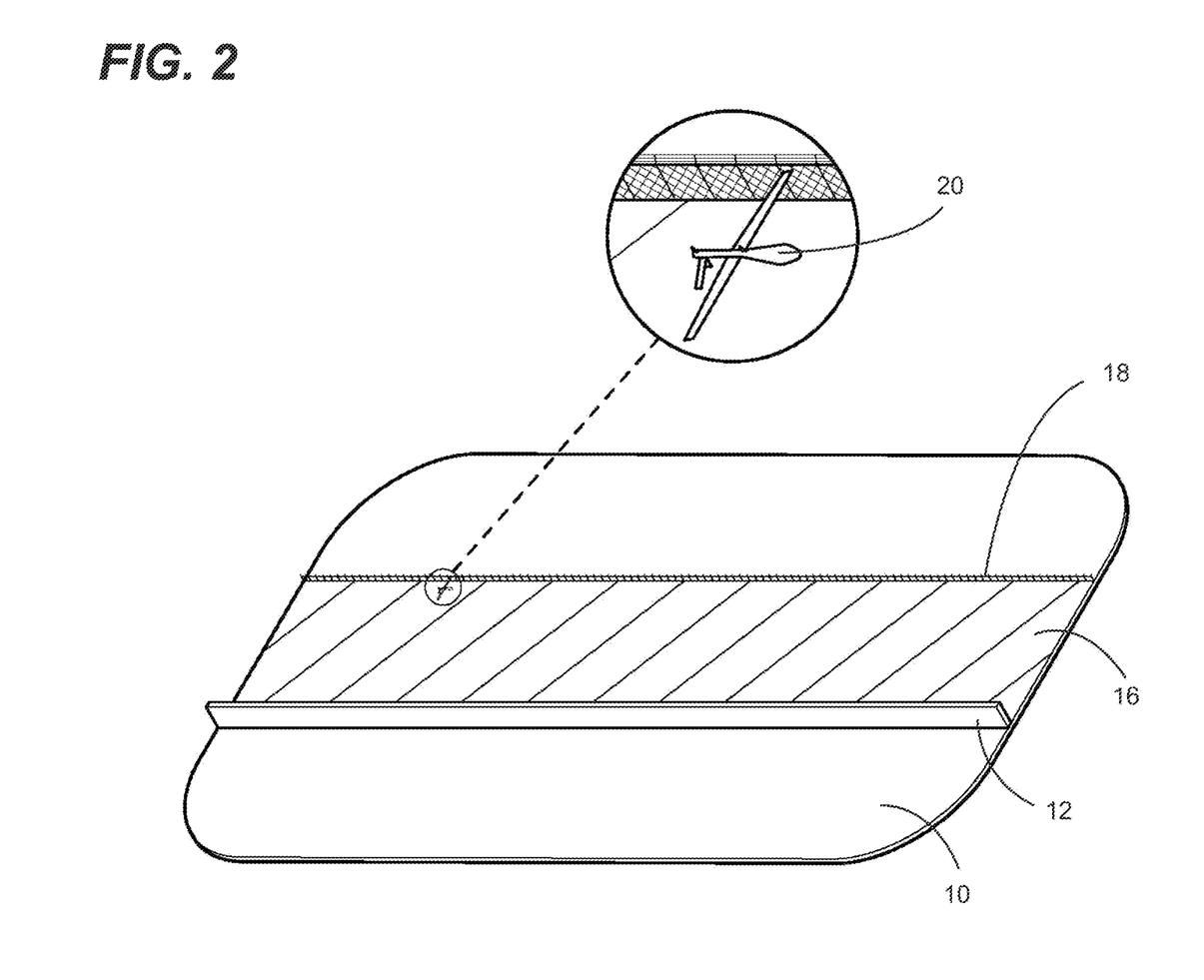
FIG. 2 is a diagrammatic view showing the intrusion detection zone of FIG. 1 with the addition of a drone responder.

Referring to FIGS. 1 and 2, an area 10 such as a portion of the border between a first country (e.g., Mexico) and a second country (e.g., The United States) is shown. Such states are examples of sovereign entities. The border may be identified by a border fence or wall 12, which may or may not be intended to block or minimize traffic across the border. Single fences or walls along the border have been shown to be of minimal success in securing the border. Typically digging passage under the wall or scaling the wall has been done with relative ease. Using troops on the ground such as border patrol agents has not proven effective in reducing or eliminating entry. The same issues hold true for protected perimeters around a secured are such as a power substation or the like. The only condition where a single fence is effective is in small, protected area where constant surveillance and constant presence of response teams can be maintained, such as prisons and the like.

Embodiments of the present invention provide continuous surveillance and, when an encroachment of the border occurs, alerts to response agencies showing both the location and time of the event are provided in real-time or at last near real-time. Such surveillance and response is accomplished by placing a network of randomly placed fiber optic sensor cabling 14 (i.e., a fiber optic cable network) beneath the surface of an intrusion detection zone 16. The optic sensor cabling 14 may be disposed within a mat 17 (e.g., disposed within interconnectable segments thereof) or other support body similarly suited for supporting and protecting the optic sensor cabling 14. The intrusion detection zone 16 may be defines as a zone between the border fence or wall 12 and an intrusion zone fence, border, or wall 18.

The intrusion zone 16 may be of any width, but in accordance with the subject invention, is intended to be wide enough to make passage on foot difficult, if not impossible. For example, 300 feet is presumed to be sufficiently wide to eliminate foot traffic. The physical border wall 12 and an opposite intrusion wall are optional and are used primarily as a visible deterrent and to keep animals from entering the intrusion zone and sending false signals.

FIG. 2 shows the use of a drone 20 as a secondary surveillance tool, taking and transmitting visual data. Cameras may also be deployed, particularly at potentially high volume traffic areas. However, due to the nature of the design and installation of the fiber optic grid, any intrusion should be picked up by the fiber optic sensor system and the other surveillance tools are primarily redundant.

Figure 3:
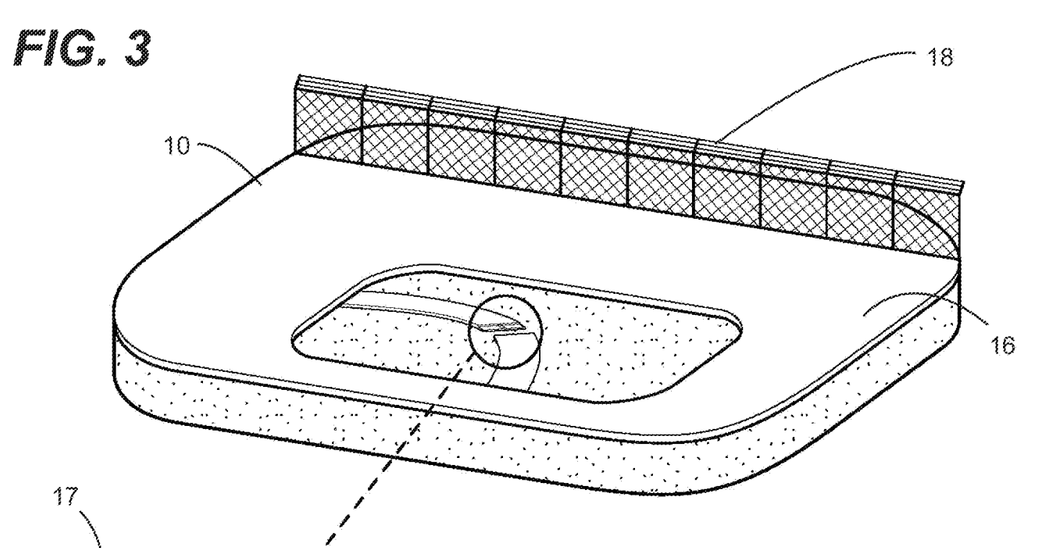
FIG. 3 shows installation of the fiber optic cable in an exposed area where the fiber optic system may be at or above the surface.
Figure 4:
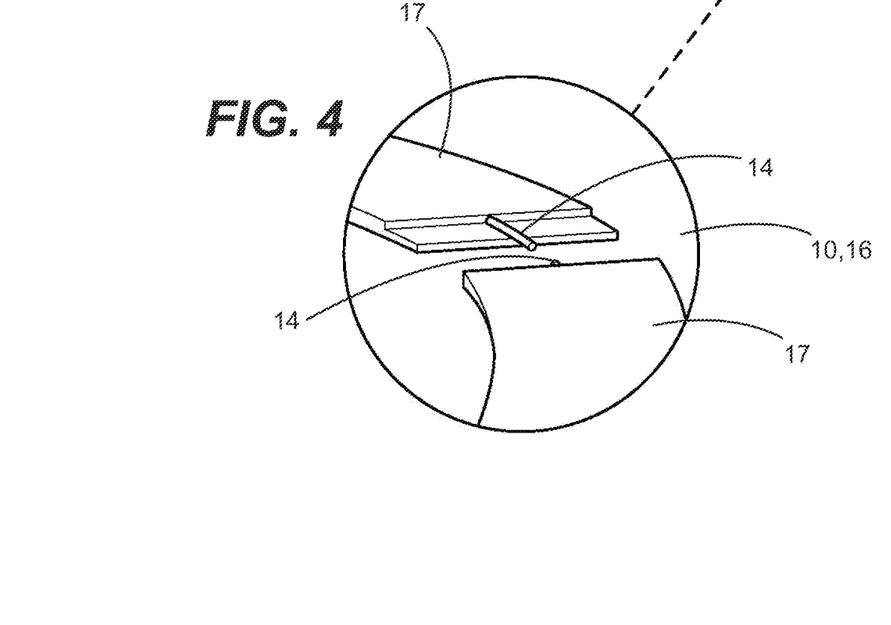
FIG. 4 is a partial, enlarged view of FIG. 3

In the preferred embodiment, and as shown in FIGS. 3 and 4, the fiber optic cable network is integral with (e.g., incased in or attached to) a weather and wear resistant mat 17, which is an embodiment of a sensor mounting substrate configured in accordance with an embodiment of the present invention. The mat 17 aids in distributing load (e.g., that of an offending intruder) on the cable to reduce wear and assists in accurately locating the point of intrusion. The fiber optic cable 14 (e.g., part of a fiber optic cable network) and the mat 17 may jointly define a border incursion zone sensor system configured in accordance with an embodiment of the present invention. FIG. 4 shows the fiber optic cable 14 and mat 17 in an exposed area such as a stream or a hard rock under surface area. While not as ideal as buried systems, this is totally functional and will send an alert signal even if the cable is cut or tampered with.

In view of the disclosures made herein, a skilled person will understand that a border incursion zone sensor system configured in accordance with an embodiment of the present invention can comprise an elongated incursion zone sensor support (e.g., a plurality of mats 17 as shown in FIG. 4) and a plurality of elongated detection sensors extending along a length of the elongated incursion zone sensor support (e.g., one such elongated detection sensor explicitly shown as cable 12 in FIG. 4). The elongated incursion zone sensor support can include one or more rows of a plurality of sensor mounting substrates (e.g., a plurality of mats 17) attached to each other in an end-to-end fashion. Each one of the elongated detection sensors can comprise a plurality of lengths of optical fiber (e.g., cable comprising an optical fibers) that are attached in an end-to-end manner and that jointly extend along a length of the elongated incursion zone sensor support. Each one of the elongated detection sensors can be attached to the elongated incursion zone sensor support at a plurality of locations thereof or can be attached contiguously along all or a portion of a length thereof to the elongated incursion zone sensor support.

Figure 5:
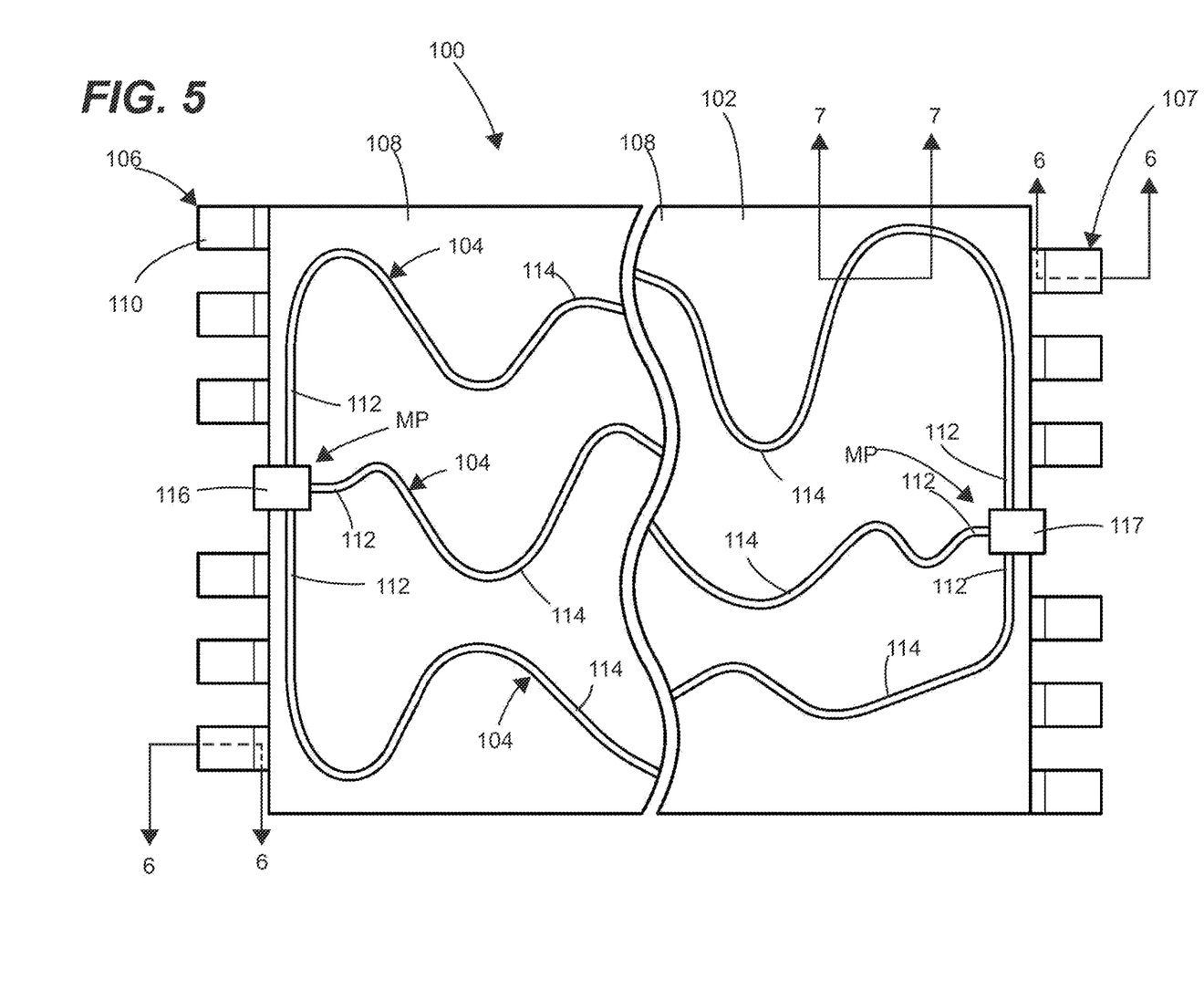
FIG. 5 is a diagrammatic view showing a boundary traversal sensor apparatus configured in accordance with an embodiment of the present invention.

Referring now to FIG. 5, a boundary traversal sensor apparatus 100 configured in accordance with an embodiment of the present invention is shown. The boundary traversal sensor apparatus 100 includes a sensor mounting substrate 102 and a plurality of detection sensors 104. Each one of the detection sensors 104 is attached to and extends over a length of the sensor mounting substrate 102.

Figure 6:
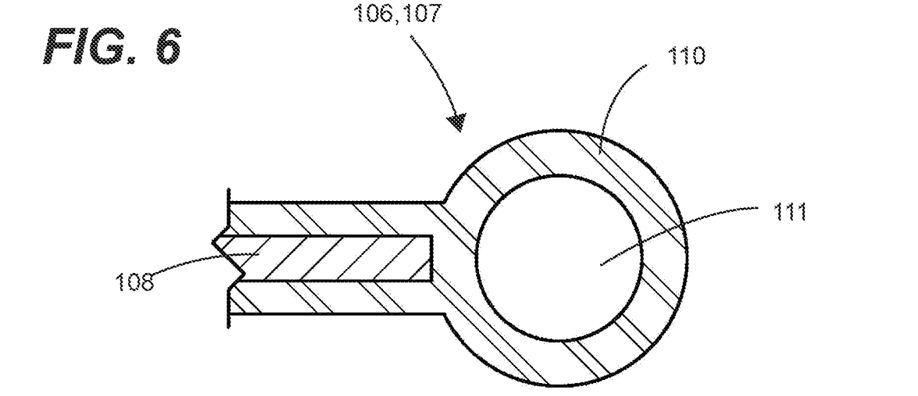
FIG. 6 is a cross-sectional view taken along the line 6-6 in FIG. 5.

As shown in FIGS. 5 and 6, the sensor mounting substrate 102 has first and second substrate end portions 106, 107 and a sensor-carrying portion 108 that extends between the substrate end portions 106, 107. The substrate end portions 106,107 are configured for allowing end-to-end attachment of a plurality of pieces of the sensor mounting substrate 102. As shown, the first substrate end portion 106 and the second substrate end portion 107 each have engagement members 110 that can be engaged with each other such as, for example, by a lock rod (not shown) that extends through a retaining member passage 111 of each of the engagement members 110 to limit unrestricted axial displacement between the respective pieces of the sensor mounting substrate 102. Such a lock rod is one example of a discrete substrate coupler for engaging adjacent pieces of a sensor mounting substrate configured in accordance with embodiments of the present invention.

It is also disclosed herein that the first and second substrate end portions 106, 107 can be jointly configured to mechanically engage each other to limit unrestricted axial displacement of respective pieces of the sensor mounting substrate without the need for a discrete (i.e., stand-alone, discrete) retaining device. For example, the first and second substrate end portions 106, 107 can each include integral retaining structure that are configured to matingly engage each other to limit unrestricted axial displacement of respective pieces of the sensor mounting substrate. In this respect, embodiments of the present invention are not unnecessarily limited to a manner in which the first and second substrate end portions 106, 107 of pieces of the sensor mounting substrate 102 can be configured to enable end-to-end attachment to each other.

Figure 7:
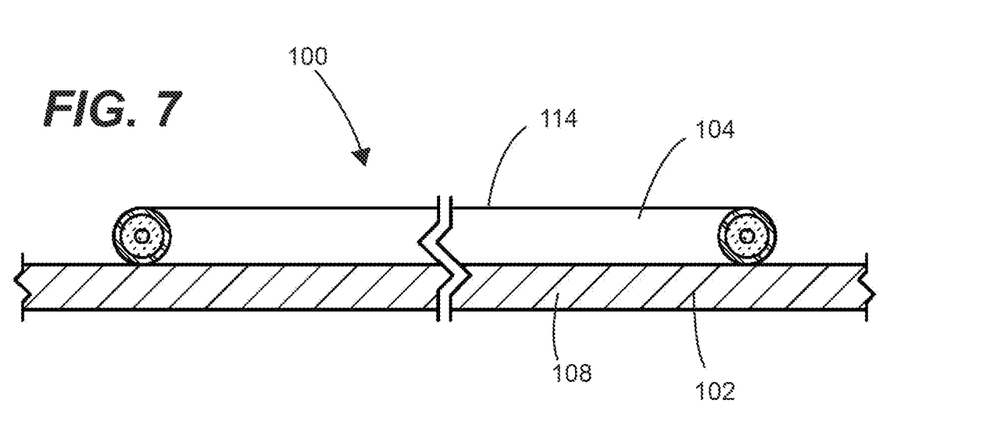
FIG. 7 is a cross-sectional view taken along the line 7-7 in FIG. 5.

As shown in FIG. 5, each one of the detection sensors 104 has opposing end portions 112 and a central portion 114. As best shown in FIG. 7, the central portion 114 of each one of the detection sensors 104 is attached to the sensor-carrying portion 108 of the sensor mounting substrate 102. In some embodiments, the central portion 114 of each one of the detection sensors 104 can be attached to the sensor-carrying portion 108 of the sensor mounting substrate 102 at a plurality of discrete locations (e.g., at regular intervals for a specified length of attachment). In some embodiments, the central portion 114 of each one of the detection sensors 104 can be attached to the sensor-carrying portion 108 of the sensor mounting substrate 102 over its entire length.

Embodiments of the present invention are not limited to a particular manner in which attachment of the central portion 114 of each one of the detection sensors 104 to the sensor-carrying portion 108 of the sensor mounting substrate 102 can be implemented. Examples of means for attaching the central portion 114 of each one of the detection sensors 104 to the sensor-carrying portion 108 of the sensor mounting substrate 102 include, but are not limited to, adhesive, encapsulation, discrete mechanical fasteners, a fastener integral with the sensor-carrying portion 108 of the sensor mounting substrate 102, and the like.

It is disclosed herein that two or more detection sensors 104 can be connected in an end-to-end manner to form an elongated detection sensor (i.e., an assembly of individual detection sensors). To this end, to permit detection sensors 104 of adjacent boundary traversal sensor apparatuses 100 to be connected with each other, the opposing end portions 112 of each of the detection sensors 104 can terminate into a respective one of first and second detection sensor connectors 116, 117 that is located at the corresponding one of the substrate end portions 106, 107. The first detection sensor connector 116 at the first substrate end portion 106 can be configured to engage the second detection sensor connector 117 at the second substrate end portion 107. Alternatively, to enable bi-directional engagement of each sensor mounting substrate 102, the first and second detection sensor connectors 116, 117 can be substantially the same and a patch cable or connector can be engaged therebetween for providing connection of the detection sensors 104 of adjacent boundary traversal sensor apparatuses 100. Optionally, each end portion of each one of the detection sensors 104 can have a respective connector attached thereto, whereby interconnection between detection sensors of adjacent sensor mounting substrates can be made on a per sensor basis. Still further, it is disclosed herein that the detection sensor connectors 116, 117 can be entirely omitted from the detection sensors 104, thereby requiring in-the-field installation of a connector or connectors between the ends of the detection sensors 104 of adjacent boundary traversal sensor apparatuses 100 with discrete (i.e., stand-alone) connectors.

Preferably, for each one of the detection sensors 104, most distant points of attachment of a respective one of the detection sensors 104 to the sensor mounting substrate 102 (i.e., the point at which the substrate end portions 106, 107 serve the purpose of sensor interconnection rather than detection signal generation) is at or substantially near a mid-point position MP of the corresponding one of the substrate end portions 106, 107. Such position of the allows for the sensor connectors 116, 117 of adjacent boundary traversal sensor apparatuses to be suitable adjacent to each other for enabling interconnection thereof. In preferred embodiments, the sensor connectors 116, 117 of adjacent boundary traversal sensor apparatuses 100 are positioned at the mid-point position MP of the corresponding one of the substrate end portions 106, 107 for direct interconnection of such connectors 116, 117 such as, for example, upon interconnection of the adjacent boundary traversal sensor apparatuses 100.

In preferred embodiments, a length of the central portion 114 of one or more of the detection sensors 102 is substantially greater than a length of the sensor-carrying portion 108 of the sensor mounting substrate 102. The length of such one or more of the detection sensors that is substantially greater than the length of the sensor-carrying portion 108 of the sensor mounting substrate 102 extends substantially non-linearly between the substrate end portions 106, 107. Such non-linear arrangement advantageously allows for a substantially random and/or non-predictable orientation of the of the central portion 114 of the one or more of the detection sensors 102, thereby limiting the potential for an offending intruder to traverse a width of the boundary traversal sensor apparatus 100 with any degree of certainty of where the one or more of the detection sensors 104 are located.

Figure 8:
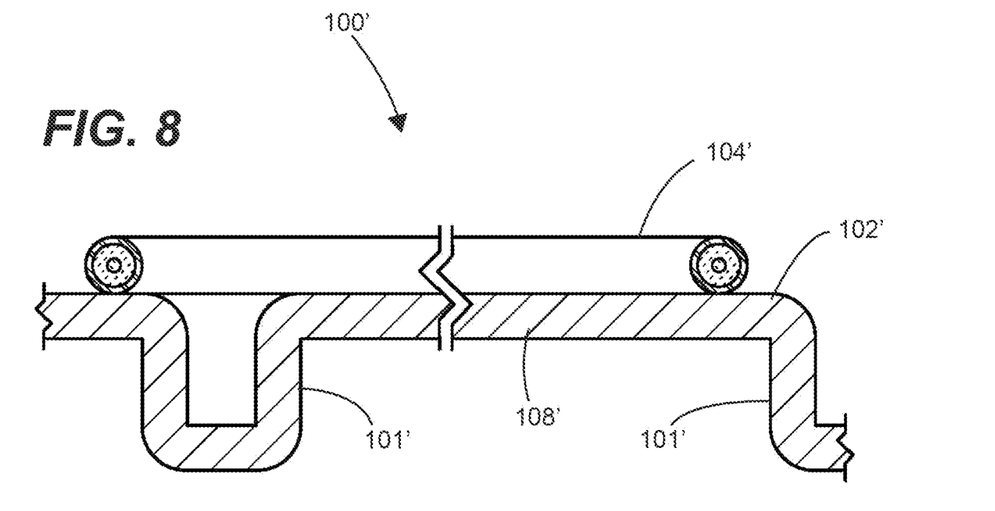
FIG. 8 is a cross sectional view showing an alternative embodiment of the boundary traversal sensor apparatus shown in FIG. 5.

It is disclosed herein that the sensor-carrying portion 108 of the sensor mounting substrate 102 can be configured to enhance a signal generated by the detection sensors 104 in response to an applied load (e.g., weight of an offending intruder). In some embodiments, the sensor-carrying portion 108 of the sensor mounting substrate 102 can have a physical construction that provides for such enhanced signal generation. For example, as shown in FIG. 8, which is an alternate embodiment to the boundary traversal sensor apparatus shown in FIGS. 5 and 7, a boundary traversal sensor apparatus 100' configured in accordance with an embodiment of the present invention can include a plurality of detection sensor signal amplifying members 101'. Each one of the detection sensors 104 can be attached to two or more of the sensor signal amplifying members 101' at a location within the sensor-carrying portion 108' of the sensor mounting substrate 102'. The detection sensor signal amplifying members 101' provide signal-enhancing physical structures (e.g., a discontinuities) within the sensor-carrying portion 108' of the sensor mounting substrate 102' for allowing partial decoupling of one section of the sensor-carrying portion 108' of the sensor mounting substrate 102' from an immediately adjacent section thereto. In doing so, a signal generated by a segment of one or more detection sensors 104' adjacent thereto may be enhanced (i.e., of a greater magnitude) relative to a sensor-carrying portion 108' that is devoid of such signal-enhancing physical structures.

Other types of features that a sensor mounting substrate can included for providing detection sensor signal amplifying functionality can include, but are not limited to, holes, channels, recesses, ribs, dimples, upstanding posts, one or more compliant material layers, and the like. The underlying objective of including one or more of such features in the sensor-carrying portion of the sensor mounting substrate is to enable a load applied at a particular location of the sensor-carrying portion of the sensor mounting substrate to exhibit greater deflection/deformation with respect to surrounding locations of the sensor-carrying portion of the sensor mounting substrate that if such feature(s) were omitted.

Advantageously, discontinuities that extend horizontally across a width of the such as the sensor-carrying portion of the sensor mounting substrate aids is enabling the sensor mounting substrate to be formed into a roll. Being formed into a roll allows one or more boundary traversal sensor apparatuses 100 to be fabricated in relatively long lengths (e.g., 100's of feet to many 1000's of feet) and shipped to a point of installation. In one embodiment, detection sensor signal amplifying members can be implemented to be such horizontally-extending discontinuities.

In preferred embodiments, a system configured in accordance with the present invention (e.g., a fiber optic cable system) is a distribute fiber optic sensor system based on back-scattered light. This system utilizes the entire length of the fiber optic cable as a sensing device. Other examples of useful fiber optic systems include the Bragg grating network, which is well-known to a person of ordinary skill in the art of optical fibers. This is an implementation of the operating condition signal generating portion of the optical fiber. Wavelength for the Bragg gratings may range from about 1200 to about 1700 nanometers with reflectively thereon being generally greater than about 10% and preferably greater than about 90%. It is also disclosed herein that other implementations of generating incursion alerts are also contemplated. By way of example, such other implementations of generating operating condition information include, but are not limited to, distributed strain signal generating techniques, Sagano signal generating techniques, Micheloson signal generating techniques, and Fabry Perot signal generating techniques. It is also disclosed herein that electrical based sensors such as restive strain gauges, accelerometers, and/or potentiometers may optionally be used (e.g., in combination with fiber optic sensors) for generating alert information.

Using optical time domain reflectometer technology, which is known in the art, it is possible to determine an amount of backscattered light at each point along a fiber optic cable and thereby determine a location at which a direct or indirect input (force application from foot traffic, disturbance of surrounding media, etc.) is provided onto the fiber optic cable. A fiber optic cable inherently contains an even distribution of impurities which forces a reflection of light back toward the light source. An optical sensing module in accordance with an embodiment of the present invention (or other apparatus in a data acquisition system in accordance with an embodiment of the present invention), which is connected to the optical fiber of the fiber optic cable, can include one or more photodetectors that receives backscattered light. The optical sensing module can continuously sample the amount of backscattered light at each point along the fiber optic cable and compares the backscattered light intensity along the fiber optic cable 16 with a previous sample to determine where a sufficient change in backscattered light intensity has occurred.

In a preferred embodiment of the present invention, a data acquisition system configured in accordance with an embodiment of the present invention is adapted to receive a signal comprising the presence of an interference of the fiber optic grid, indicating an intrusion event and providing the location of the event by identifying the portion of the grid being disturbed. The data acquisition system, which can comprise an optical sensing module and/or a multiplexing unit with a time division multiplexing module. The cabling, connectors, breakout assemblies and support hardware are designed to provide ruggedness during installation and provide attenuation free light transfer. The system is designed for long service life and has measure incorporated to minimize any light transmittal issues such as fiber darkening from hydrogen infusion. Because there are various local measurement locations along the pipeline fiber breakout assemblies incorporated into the invention.

Systems and methods in accordance with embodiments of the inventive subject matter can be implemented in any number of different types of data processing apparatus (e.g., a server, a smart phone, and the like). In particular embodiments, when the data processing apparatus is connected to a network, the data processing apparatus can communicate with other devices, specifically mobile devices and enterprise systems. Communications to and from data processing apparatus can be sent through the network interface. For example, the network interface can receive incoming communications (such as requests or responses from other devices) in the form of one or more packets (such as Internet Protocol (IP) packets) from the network, and the data processing apparatus can store the incoming communications in memory for processing. The data processing apparatus can similarly store outgoing communications (such as requests or responses to other devices) in the form of one or more packets in memory and communicated to the network. The Processor can access these communication packets stored in memory for processing.

Those of skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

The previous description of the disclosed embodiments is provided to enable any person skilled in the art to make or use the inventive subject matter. Various modifications to these embodiments will be readily apparent to those skilled in the art, and the generic principles defined herein can be applied to other embodiments without departing from the spirit or scope of the inventive subject matter. Thus, the inventive subject matter is not intended to be limited to the embodiments shown herein but is to be accorded the widest scope consistent with the principles and novel features disclosed herein.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A boundary traversal sensor apparatus, comprising:
    a plurality of detection sensors each including a length of optical fiber having opposing end portions;
    a sensor mounting substrate having opposing end portions and a sensor-carrying portion extending therebetween, wherein each one of the opposing end portions of the sensor mounting substrate includes a substrate coupling structure engageable with at least one of a discrete substrate coupler and a substrate coupling structure of each other one of the opposing end portions of the sensor mounting substrate, wherein the length of optical fiber of each one of the detection sensors is attached to the sensor-carrying portion of the sensor mounting substrate at at least a plurality of locations thereof, and wherein each one of the opposing end portions of the optical fiber is located at a respective one of the opposing end portions of the sensor mounting substrate, wherein the sensor mounting substrate includes a plurality of detection sensor signal amplifying members, wherein each of the detection sensor signal amplifying members comprises a structural discontinuity that is integral with the sensor mounting substrate whereby each of the detection sensor signal amplifying members is deflectably coupled to at least one other one of the sensor signal amplifying members immediately adjacent thereto, and wherein at least one of the detection sensors extends over the structural discontinuity of at least one of the detection sensor signal amplifying members.

2. The boundary traversal sensor apparatus of claim 1 wherein the substrate coupling structure at the opposing end portions of the sensor mounting substrate each have a respective structural configuration enabling mating engagement therebetween.

3. The boundary traversal sensor apparatus of claim 2 wherein:
    each one of the detection sensors includes an optical fiber connector coupled to each one of the opposing end portions of the length of optical fiber thereof, and
    the optical fiber connector at a first one of the opposing end portions of the optical fiber is engageable with the optical fiber connector at a second one of the opposing end portions of the optical fiber.

4. The boundary traversal sensor apparatus of claim 3 wherein:
    the length of the optical fiber of at least one of the detection sensors is substantially greater than a length of the sensor-carrying portion of the sensor mounting substrate; and
    the optical fiber of the at least one of the detection sensors extends substantially non-linearly over a length of the sensor-carrying portion of the sensor mounting substrate.

5. The boundary traversal sensor apparatus of claim 1 wherein, for each one of the detection sensors, most distant points of attachment of the optical fiber to the sensor mounting substrate along the length thereof are approximately at a mid-point position of an adjacent one of said opposing end portions.

6. The boundary traversal sensor apparatus of claim 5 wherein the optical fiber of each one of the detection sensors is attached to the sensor mounting substrate along the entire length thereof between the most distant points of attachment thereof to the sensor mounting substrate.

7. The boundary traversal sensor apparatus of claim 1 wherein:
    the length of the optical fiber of at least one of the detection sensors is substantially greater than a length of the sensor-carrying portion of the sensor mounting substrate; and
    the optical fiber of the at least one of the detection sensors extends substantially non-linearly over a length of the sensor-carrying portion of the sensor mounting substrate.

8. The boundary traversal sensor apparatus of claim 1 wherein:
    each one of the detection sensors includes an optical fiber connector coupled to each one of the opposing end portions of the length of optical fiber thereof; and the optical fiber connector at a first one of the opposing end portions of the optical fiber is engageable with the optical fiber connector at a second one of the opposing end portions of the optical fiber.

9. The boundary traversal sensor apparatus of claim 8 wherein, for each one of the detection sensors, most distant points of attachment of the optical fiber to the sensor mounting substrate along the length thereof are approximately at a mid-point position of an adjacent one of said opposing end portions.

10. The boundary traversal sensor apparatus of claim 9 wherein the optical fiber of each one of the detection sensors is attached to the sensor mounting substrate along the entire length thereof between the most distant points of attachment thereof to the sensor mounting substrate.

11. The boundary traversal sensor apparatus of claim 8 wherein:
the length of the optical fiber of at least one of the detection sensors is substantially greater than a length of the sensor-carrying portion of the sensor mounting substrate; and
the optical fiber of the at least one of the detection sensors extends substantially non-linearly over a length of the sensor-carrying portion of the sensor mounting substrate.

12. The boundary traversal sensor apparatus of claim 1 wherein the structural discontinuity includes at least one of at least one hole, at least one channel, at least one recess, at least one rib, at least one dimple, and at least one upstanding post.

13. The boundary traversal sensor apparatus of claim 12 wherein:
at least a portion of each one of the sensor signal amplifying members is located within the sensor-carrying portion of the sensor mounting substrate; and
the optical fiber of at least one of the detection sensors is attached to two or more of the sensor signal amplifying members at a location within the sensor-carrying portion of the sensor mounting substrate.

14. The boundary traversal sensor apparatus of claim 12 wherein:
the length of the optical fiber of at least one of the detection sensors is substantially greater than a length of the sensor-carrying portion of the sensor mounting substrate; and
the optical fiber of the at least one of the detection sensors extends substantially non-linearly over a length of the sensor-carrying portion of the sensor mounting substrate.

15. A border incursion zone sensor system, comprising:
an elongated incursion zone sensor support including a least one row of a plurality of sensor mounting substrates attached to each other in an end-to-end fashion, wherein at least one of the sensor mounting substrates includes a plurality of detection sensor signal amplifying members and wherein each of the detection sensor signal amplifying members comprises a structural discontinuity that is integral with the at least one sensor mounting substrate whereby the at least one detection sensor signal amplifying members is deflectably coupled to at least one other one of the sensor signal amplifying members immediately adjacent thereto; and
a plurality of elongated detection sensors extending along a length of the elongated incursion zone sensor support, wherein each one of the elongated detection sensors is attached to the elongated incursion zone sensor support at at least a plurality of locations thereof and wherein at least one of the elongated detection sensors extends over the structural discontinuity of at least one of the detection sensor signal amplifying members.

16. The border incursion zone sensor system of claim 15 wherein each one of the elongated detection sensors includes a plurality of segments of optical fiber operably attached to each other in an end-to-end manner.

17. The border incursion zone sensor system of claim 15 wherein the structural discontinuity includes at least one of at least one hole, at least one channel, at least one recess, at least one rib, at least one dimple, and at least one upstanding post.

18. The border incursion zone sensor system of claim 17 wherein:
for each one of the sensor mounting substrates, each one of the elongated detection sensors is attached to two or more of the sensor signal amplifying members of a respective one of the sensor mounting substrates at a location within a sensor-carrying portion thereof.

19. The border incursion zone sensor system of claim 15 wherein:
a length of each one of the elongated detection sensors is substantially greater than a length of the elongated incursion zone sensor support; and
the length of each one of the elongated detection sensors extends substantially non-linearly between opposing end portions of the elongated incursion zone sensor support.

20. The border incursion zone sensor system of claim 19 wherein the structural discontinuity includes at least one of at least one hole, at least one channel, at least one recess, at least one rib, at least one dimple, and at least one upstanding post.

21. The border incursion zone sensor system of claim 20 wherein:
for each one of the sensor mounting substrates, each one of the elongated detection sensors is attached to two or more of the sensor signal amplifying members of a respective one of the sensor mounting substrates at a location within a sensor-carrying portion thereof.

22. The border incursion zone sensor system of claim 21 wherein each one of the elongated detection sensors includes a plurality of segments of optical fiber operably attached to each other in an end-to-end manner.

* * * * *